US012613180B2

(12) United States Patent
Masuhara et al.

(10) Patent No.: US 12,613,180 B2
(45) Date of Patent: Apr. 28, 2026

(54) PARTICLE ISOLATION DEVICE, PARTICLE ISOLATION METHOD, AND PROGRAM

(71) Applicant: Sony Group Corporation, Tokyo (JP)

(72) Inventors: Shin Masuhara, Tokyo (JP); Tsutomu Maruyama, Kanagawa (JP); Isao Hidaka, Tokyo (JP); Tomoyuki Umetsu, Tokyo (JP)

(73) Assignee: Sony Group Corporation, Tokyo (JP)

( * ) Notice: Subject to any disclaimer, the term of this patent is extended or adjusted under 35 U.S.C. 154(b) by 144 days.

(21) Appl. No.: 18/569,209

(22) PCT Filed: Feb. 1, 2022

(86) PCT No.: PCT/JP2022/003823
§ 371 (c)(1),
(2) Date: Dec. 11, 2023

(87) PCT Pub. No.: WO2022/264481
PCT Pub. Date: Dec. 22, 2022

(65) Prior Publication Data
US 2024/0280463 A1    Aug. 22, 2024
US 2025/0085208 A9    Mar. 13, 2025

(30) Foreign Application Priority Data

Jun. 18, 2021    (JP) ................................. 2021-102067

(51) Int. Cl.
*G01N 15/1404*    (2024.01)
(52) U.S. Cl.
CPC ... *G01N 15/1404* (2013.01); *G01N 2015/142* (2013.01)
(58) Field of Classification Search
CPC ......... G01N 15/1404; G01N 2015/142; G01N 2015/1006; G01N 15/149; G01N 15/14
(Continued)

(56) References Cited

U.S. PATENT DOCUMENTS

2010/0297759 A1    11/2010    Kanda
2015/0068957 A1     3/2015    Otsuka et al.
2020/0173905 A1     6/2020    Suzuki et al.

FOREIGN PATENT DOCUMENTS

JP        2006-292769 A    10/2006
JP        2019-190991 A    10/2019
(Continued)

OTHER PUBLICATIONS

International Search Report and English translation thereof mailed Mar. 29, 2022 in connection with International Application No. PCT/JP2022/003823.

*Primary Examiner* — Md M Rahman
(74) *Attorney, Agent, or Firm* — Wolf, Greenfield & Sacks, P.C.

(57)    ABSTRACT

To provide a technology capable of stabilizing droplets.

Provided is a particle isolation device or the like including: a vibration unit that applies vibration to a fluid containing sheath liquid by supplying a driving voltage based on each of a plurality of frequencies; an imaging unit that acquires, at a position where the fluid is formed into droplets through the vibration, an image of the fluid and each of the droplets; a liquid temperature control unit that controls a liquid temperature of the sheath liquid; and a frequency control unit that acquires data regarding a state of the droplet at each of the frequencies per liquid temperature of the sheath liquid from the image captured by the imaging unit, and controls the frequency of the driving voltage on the basis of a variation in the data accompanying a change in the liquid temperature of the sheath liquid.

16 Claims, 7 Drawing Sheets

(58) Field of Classification Search
    USPC ......................................................... 356/246
    See application file for complete search history.

(56)                    References Cited

FOREIGN PATENT DOCUMENTS

| WO | WO 2009/078307 A1 | 6/2009 |
| WO | WO 2014/115409 A1 | 7/2014 |
| WO | WO 2019/207851 A1 | 10/2019 |
| WO | WO 2020/149042 A1 | 7/2020 |

PARTICLE ISOLATION DEVICE, PARTICLE ISOLATION METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/003823, filed in the Japanese Patent Office as a Receiving Office on Feb. 1, 2022, which claims priority to Japanese Patent Application Number JP2021-102067, filed in the Japanese Patent Office on Jun. 18, 2021, each of which is hereby incorporated by reference in its entirety.

TECHNICAL FIELD

The present technology relates to a particle isolation device, a particle isolation method, and a program. More specifically, the present invention relates to a particle isolation device, a particle isolation method, and a program capable of stabilizing droplets.

BACKGROUND ART

Currently, a technology called flow cytometry is used for analyzing biologically relevant particles such as cells and microorganisms, and particles such as microbeads. Flow cytometry is an analysis method in which particles are poured in a state of being aligned in a fluid, and the particles are irradiated with light to detect light emitted from each particle, thereby analyzing and isolation the particles. A device used for the flow cytometry is called a flow cytometer (also referred to as a "cell sorter").

In a flow cytometer, generally, a vibrating element is provided at a section of a flow path through which particles encased in sheath liquid flow, and this vibrating element vibrates a portion of the flow path to continuously form the fluid discharged from the discharge port of the flow path into droplets. Then, on the basis of a detection signal obtained by the light irradiation, the droplets containing particles are charged positively (+) or negatively (−), or left uncharged, and split by a deflector plate according to the charge state, and the target particles are collected in the respective recovery vessels. The group of droplets deflected to the left or right by the positive charge or the negative charge passes through a certain trajectory, and becomes a linear, inclined liquid flow in appearance. A group of uncharged droplets traveling vertically downward is called a "center stream", whereas the inclined linear liquid flows are called "side streams".

It is important to stabilize the droplets so that the side stream is correctly guided to the recovery vessel, in order to maintain a constant side-stream trajectory. In response to this, for example, Patent Document 1 discloses a technology for stabilizing droplets by controlling the driving voltage of the vibrating element so that the distance between the end of a droplet immediately before break-off and the end of a satellite droplet one position before the droplet is constant in a droplet observation image. Furthermore, Patent Document 2 discloses a technology for stabilizing droplets by controlling the driving voltage of the vibrating element with a focus on the length of a first satellite. Moreover, Patent Document 3 discloses a technology for controlling a liquid temperature of sheath liquid in a sheath liquid introduction unit that introduces the sheath liquid into the flow path to prevent droplet instability arising from a variation in the flow velocity of the sheath liquid due to a change in environmental temperature, although the main purpose is to stabilize the flow velocity at the time of measurement.

CITATION LIST

Patent Document

Patent Document 1: WO 2014/115409 A
Patent Document 2: Japanese Patent Application Laid-Open No. 2006-292769
Patent Document 3: Japanese Patent Application Laid-Open No. 2019-190991

SUMMARY OF THE INVENTION

Problems to be Solved by the Invention

However, the reality is that the technology for maintaining a constant side-stream trajectory and stabilizing droplets is still insufficient and further development of the technology is required.

Therefore, an object of the present technology is mainly to provide a technology capable of stabilizing droplets.

Solutions to Problems

The present technology provides a particle isolation device or the like including: a vibration unit that applies vibration to a fluid containing sheath liquid by supplying a driving voltage based on each of a plurality of frequencies; an imaging unit that acquires, at a position where the fluid is formed into droplets through the vibration, an image of the fluid and each of the droplets; a liquid temperature control unit that controls a liquid temperature of the sheath liquid; and a frequency control unit that acquires data regarding a state of the droplet at each of the frequencies per liquid temperature of the sheath liquid from the image captured by the imaging unit, and controls the frequency of the driving voltage on the basis of a variation in the data accompanying a change in the liquid temperature of the sheath liquid.

Furthermore, the present technology also provides a particle isolation method including: a vibration step of applying vibration to a fluid containing sheath liquid by supplying a driving voltage based on each of a plurality of frequencies; an imaging step of acquiring, at a position where the fluid is formed into droplets through the vibration, an image of the fluid and each of the droplets; a liquid temperature control step of controlling a liquid temperature of the sheath liquid; and a frequency control step of acquiring data regarding a state of the droplet at each of the frequencies per liquid temperature of the sheath liquid from the image captured by the imaging unit, and controls the frequency of the driving voltage on the basis of a variation in the data accompanying a change in the liquid temperature of the sheath liquid.

Moreover, the present technology also provides a program for causing a particle isolation device to execute functions of: applying vibration to a fluid containing sheath liquid by supplying a driving voltage based on each of a plurality of frequencies; acquiring, at a position where the fluid is formed into droplets through the vibration, an image of the fluid and each of the droplets; a liquid temperature control unit that controls a liquid temperature of the sheath liquid; and acquiring data regarding a state of the droplet at each of the frequencies per liquid temperature of the sheath liquid from the image captured, and controlling the frequency of the driving voltage on the basis of a variation in the data accompanying a change in the liquid temperature of the sheath liquid.

MODE FOR CARRYING OUT THE INVENTION

Figure 1:
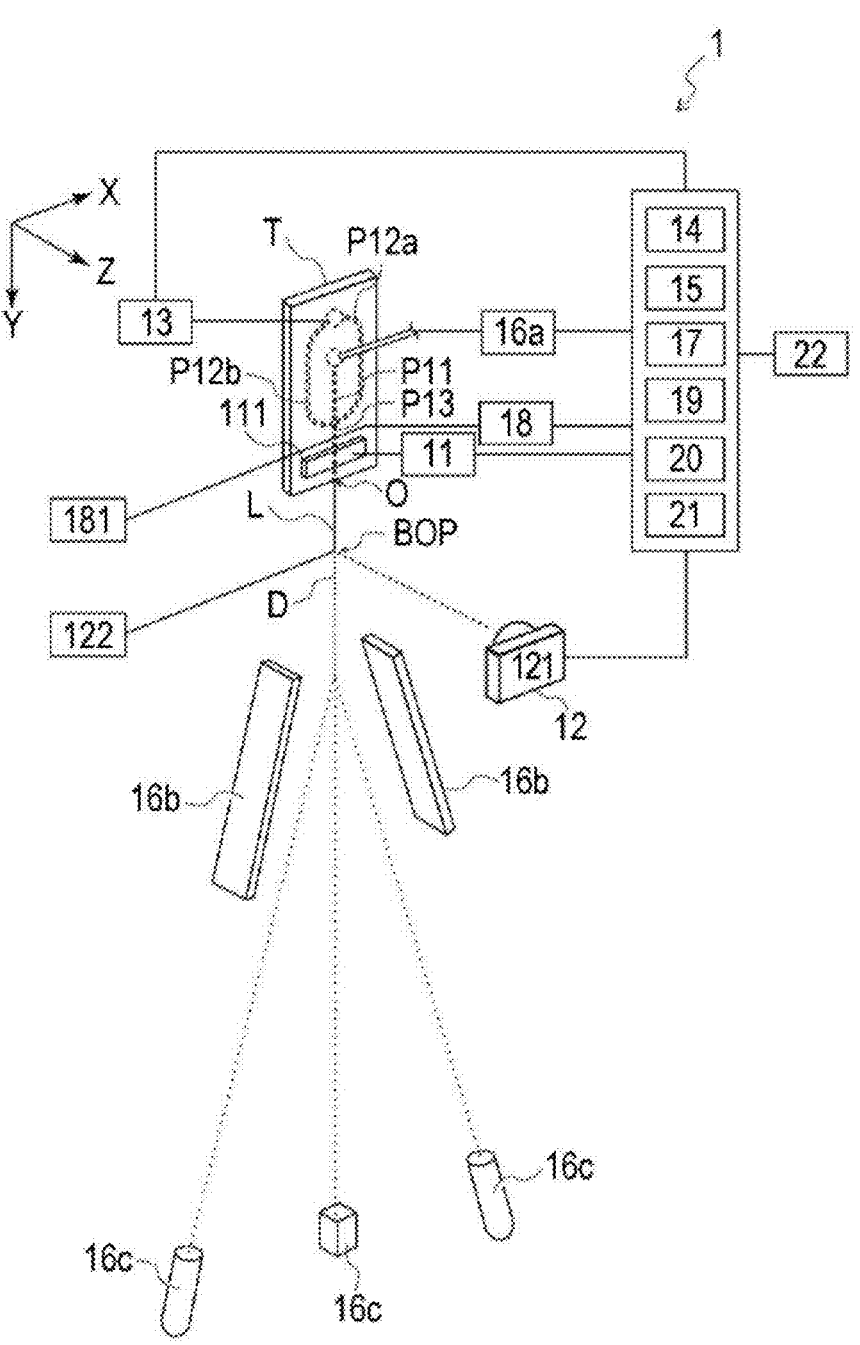
FIG. 1 is a schematic diagram illustrating a configuration example of a first embodiment of a particle isolation device according to the present technology.

Hereinafter, preferred embodiments for carrying out the present technology will be described with reference to the drawings.

Embodiments to be described below illustrate examples of representative embodiments of the present technology, and the scope of the present technology is not narrowed by them. Note that description will be given in the following order.

1. Outline of present technology
2. First Embodiment (particle isolation device 1)
    (1) Flow path P
    (2) Vibration unit 11
    (3) Imaging unit 12
    (4) Liquid temperature control unit 13
    (5) Frequency control unit 14
    (6) Determination unit 15
    (7) Charging unit 16a, deflector plate 16b, recovery vessel 16c
    (8) Break-off control unit 17
    (9) Detection unit 18
    (10) Analysis unit 19
    (11) Storage unit 20
    (12) Display unit 21
    (13) User interface 22
    (14) Others
3. Example of control flow
    (1) Measurement parameter setting process (steps S101 to S103)
    (2) BOP measurement process (Steps S104 to S110)
    (3) BOP data analysis process (steps S111 to S120)
    (4) Effects
4. Second Embodiment (particle isolation method)

1. Outline of Present Technology

The present technology is to maintain a constant side-stream trajectory that carries particles to a recovery vessel in a device that irradiates particles in a state of being aligned in a flow path with light, detects light emitted from each of the particles, charges the droplets containing the particles positively (+) or negatively (−), or leaves the droplets uncharged, on the basis of a detection signal or leaves the droplets uncharged, splits the droplet into respective droplet trajectories by a deflector plate, and collects the target particle.

In order to make the side-stream trajectory constant, precise droplet control with little temporal variation and fluctuation is required. Here, the charging of the droplets in the device described above is performed at the moment of their detachment from a liquid column. Therefore, it is essential to adjust the timing of the droplet detachment (also referred to as "break-off") and the charging pulse. When the break-off is not performed within the pulse width of the charging signal, a sufficient charge cannot be applied to the droplet, a deflection angle decreases in proportion to the charge amount, and the side stream is closed inward.

Figure 3:
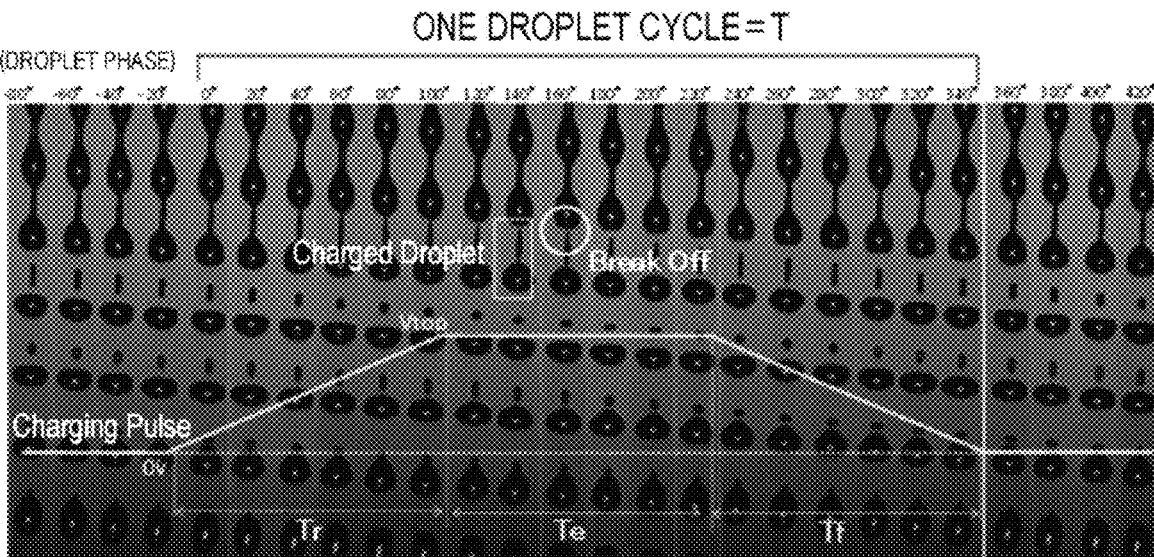
FIG. 3 is a diagram illustrating a relationship between one droplet cycle and a correct timing of a charging signal.

The charging pulse usually has a time width T equal to one droplet cycle, and hence the timing is first adjusted so that the break-off time of the target particle falls within the charging pulse width T. However, with the actual charging pulse having a rise time (Tr) and a fall time (Tf) of the charging signal, an effective pulse width (Te) at the maximum voltage (Vtop) is obtained by subtracting them from T: $Te=T−(Tf+Tr)$. For example, when a frequency of a driving voltage is 100 kHz, the one droplet cycle T is 10 μsec, and when both Tr and Tf are 3 μsec, Te is a value reduced by a half, which is 4 μsec. In a simplified manner, this Te value is a margin allowed as the temporal variation in the break-off. FIG. 3 illustrates a relationship between one droplet cycle and a correct timing of a charging signal.

Figure 4:
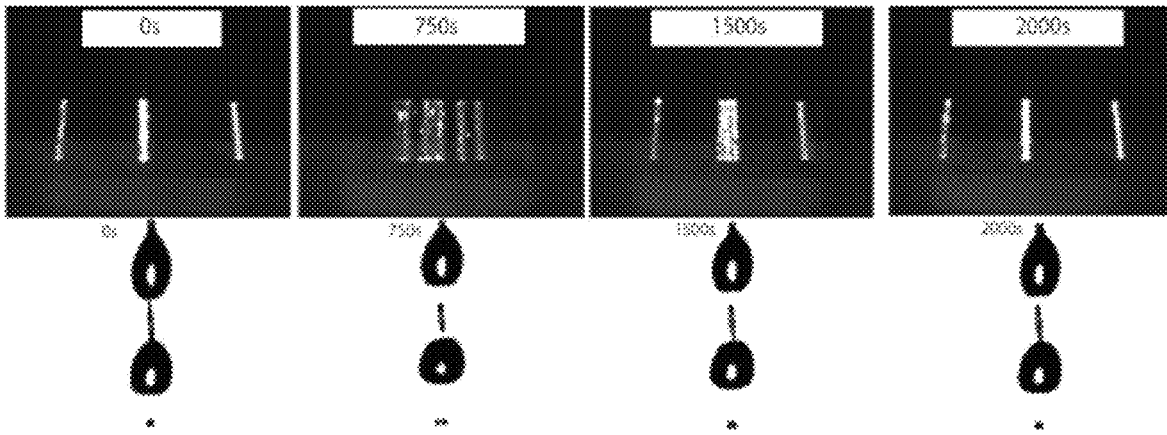
FIG. 4 is a view illustrating a state in which a droplet changes near a break-off position and a side-stream trajectory opens and closes accordingly.

The variation in the break-off position (also referred to as a "break-off point" and a "BOP") of the droplet can be observed in detail by illuminating the droplet with a light source that blinks in synchronization with the driving signal of the vibrating element and acquiring a droplet observation image with an imaging element. For example, FIG. 4 illustrates a state in which the droplet changes near the BOP and the side-stream trajectory opens and closes accordingly in a case where the frequency is set to 100 kHz and the droplet is left for 2000 seconds. In FIG. 4, the phase of the charging pulse is adjusted to the droplet so that the side stream opens at the maximum angle at the start of observation. In FIG. 4, it can be seen that the break-off timing is advanced with the lapse of time, and in particular, the length and position of a satellite droplet located between the main droplets change. Then, after 2000 seconds, the side stream returns to the maximum angle due to an advancement in the break-off timing by an amount substantially corresponding to one droplet cycle. However, the lower droplet, originally required to be charged, is not deflected, but the upper droplet shifted by one position is deflected.

In order to maintain a constant side-stream trajectory throughout the operation time for isolation (also referred to as "sorting") of the droplet containing the target particle, it is necessary to maintain a level at which changes are hardly detectable in the droplet observation image described above. As a measure for this, several droplet stabilization methods have been proposed in the past. Here, the following two methods will be described as representatives.

(i) Performing stabilization control on the droplet with reference to the droplet observation image.
    (ii) Maintaining a constant sheath liquid temperature.

Each of the methods will be described in detail below.

In the method (i) above, during sorting, the side-stream trajectory is not always clearly observed as shown in FIG. 4 because the illumination for the side stream is obstructed by the recovery vessel due to the device configuration or because the sorting frequency is very low. Therefore, this method is to apply stabilization feedback control to the droplet using the droplet observation image. Specifically, with the droplet observation image at the start of measurement as a reference, the droplet is adjusted by constantly applying feedback to the driving voltage of the vibrating element so that no change occurs in the droplet observation image. There have been several proposals on the focusing point of the droplet observation image so far, and for example, in Patent Document 1 described above, the driving voltage of the vibrating element is controlled so that the distance between the end of a droplet immediately before break-off and the end of a satellite droplet one position before the droplet is constant in the droplet observation image. Furthermore, in Patent Document 2, the driving voltage of the vibrating element is controlled by focusing on the length of a first satellite.

Figure 5:
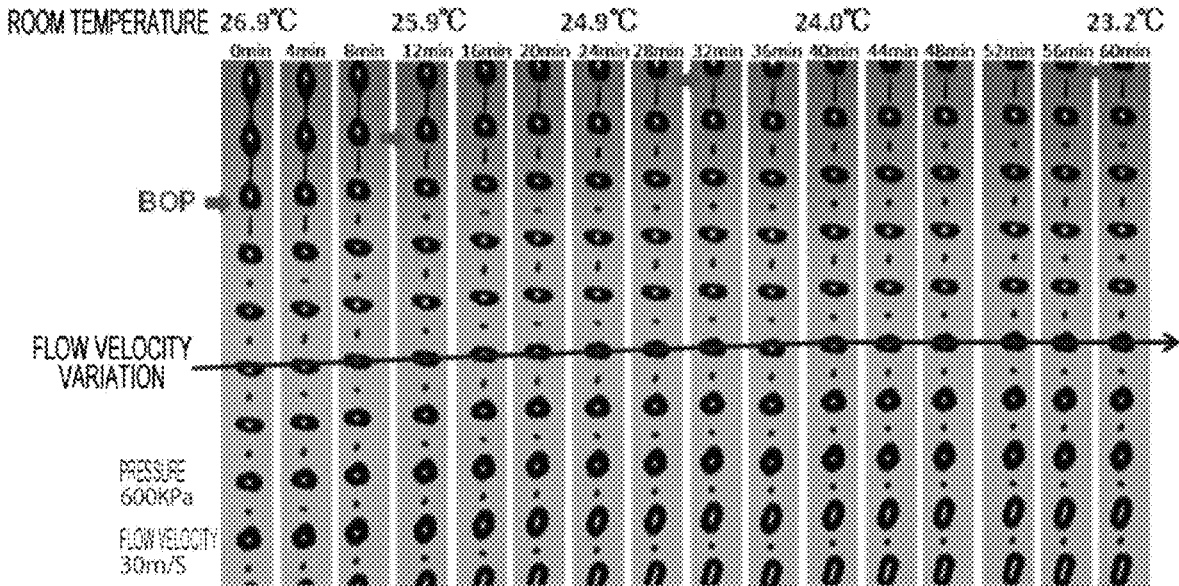
FIG. 5 is a view illustrating an example in which droplets are observed at a frequency of 100 kHz in an environment in which room temperature decreases by 3.7° C. in one hour.

The method (ii) above is based on the idea that the most influential droplet variation factor is a change in environmental temperature, except for irregular cases such as contamination by foreign matter or air bubbles, and in particular, the liquid temperature of the sheath liquid directly affects the droplet variation. When the liquid temperature of the sheath liquid varies due to changes in environmental temperature, the heat generation of the device itself, or the like, two different effects are given to the droplet. Here, FIG. 5 illustrates an example in which droplets were observed at a frequency of 100 kHz in an environment where the room temperature was decreased by 3.7° C. in one hour, and each effect will be described in detail.

The first is a change in flow velocity. The liquid viscosity changes as the liquid temperature of the sheath liquid varies, causing an increase or decrease in pressure loss in the flow path and leading to variations in the flow velocity of the jet ejected from an orifice. For example, as a result of an experiment conducted by the inventors of the present application, when the liquid temperature of the sheath liquid decreased by 4° C., the liquid viscosity increased by 8%, and the flow velocity of the jet at 30 m/s decreased by about 2%. At this time, although the BOP slightly varies to such an extent that the BOP is shortened by 20 to 30 μm, the break-off time does not change, so that a timing shift from the charging signal does not occur, and the side-stream trajectory is not affected.

The second is a change in break-off timing. The break-off timing may vary rapidly due to the variation in the liquid temperature of the sheath liquid. In FIG. 5, the break-off timing is advanced by about 2 wavelengths (20 μsec) when the room temperature decreases by about 2° C. in the first 30 minutes. This change directly affects the side-stream trajectory and is thus a major problem. Unlike the first phenomenon described above, which is reproducible on the basis of the physical properties of the sheath liquid, this phenomenon is considered to attribute to the vibration characteristics of the entire system. Therefore, the phenomenon exhibits random behavior depending on the state of the device and droplet formation conditions, and is very difficult to deal with. The problem in the present technology is the BOP variation caused by the second phenomenon.

Figure 6:
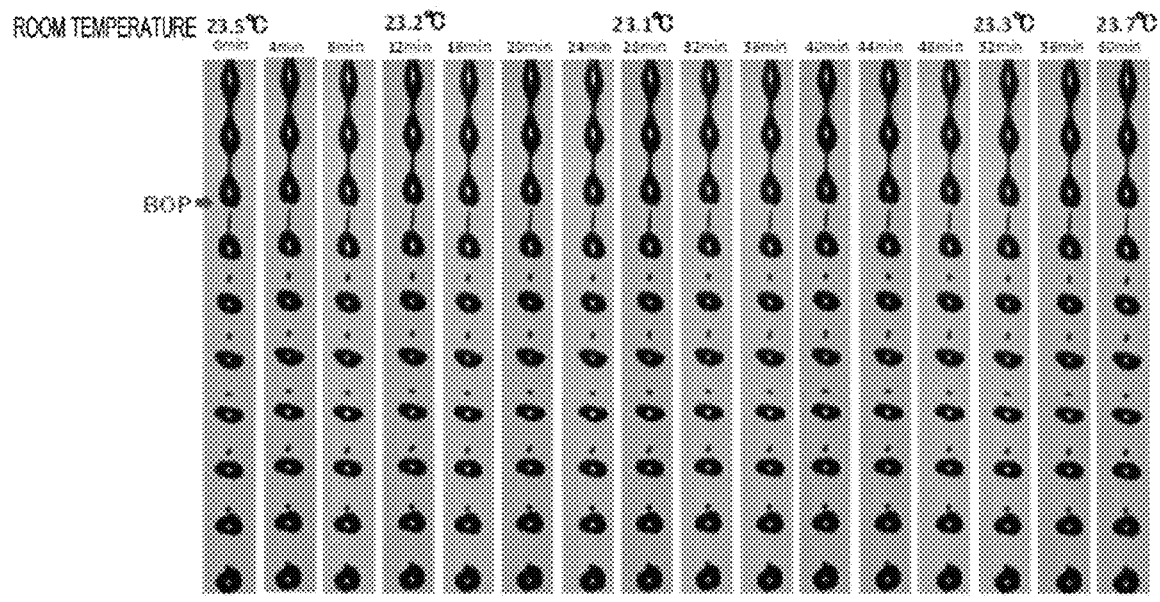
FIG. 6 is a view illustrating an example in which droplets are observed at a frequency of 100 kHz in a case where the room temperature variation within one hour is restricted to 23.4±0.3° C.

Here, FIG. 6 illustrates an example in which droplets were observed at a frequency of 100 kHz in a case where the room temperature variation within one hour was restricted to 23.4±0.3° C. Compared to FIG. 5, it can be seen that the change in the flow velocity and the change in the break-off timing are restricted greatly. However, maintaining a constant side-stream trajectory requires more accurate droplet control.

Since the influence of the liquid temperature variation in the sheath liquid is large as described above, Patent Document 3 proposes a technology for controlling a liquid temperature of sheath liquid in a sheath liquid introduction unit that introduces the sheath liquid into the flow path to prevent droplet instability arising from variations in the flow velocity of the sheath liquid due to changes in environmental temperature, although the main purpose is to stabilize the flow velocity at the time of measurement.

As the droplet stabilization method, both of the two approaches (i) and (ii) above are correct and effective. However, there are cases in which droplets become significantly unstable to the extent that they cannot be controlled even with these measures, and such a situation must be avoided beforehand. Prior to the two approaches (i) and (ii) above, the present technology proposes a method to search for a droplet stability condition that is originally highly tolerant to changes in environmental temperature.

Figure 7:
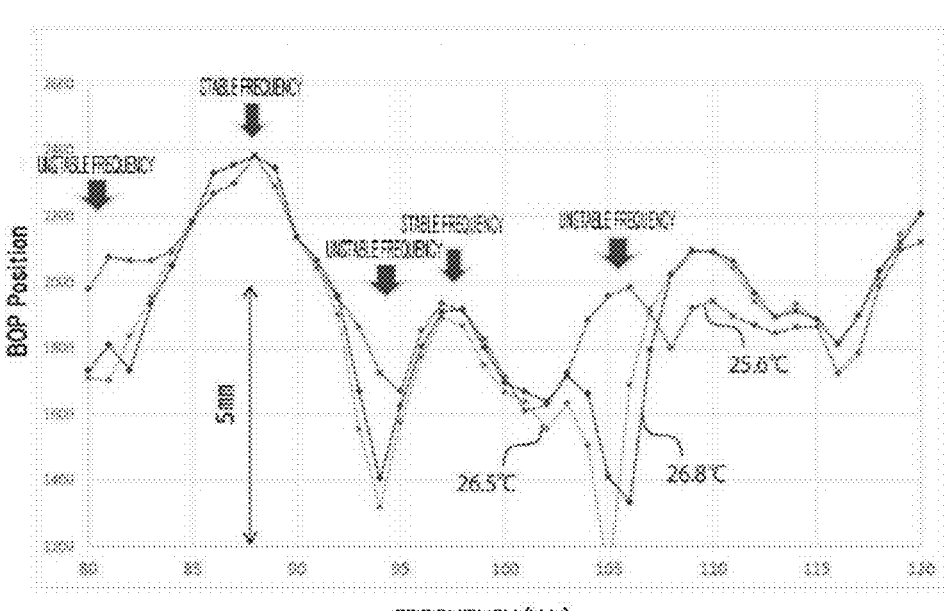
FIG. 7 is a diagram illustrating an example in which droplets become unstable at specific frequencies.

Here, an example of droplet instability at a specific frequency is illustrated in FIG. 7. In FIG. 7, the frequency characteristic of the BOP was measured three times in 1 kHz steps by changing the droplet frequency in the range of 100±20 kHz while constantly forming droplets over about two hours under the condition of a liquid feeding pressure of 600 kPa. Note that the driving voltage of the vibrating element is fixed, and feedback control is not applied. The test chamber temperature was 25.6° C. in the first measurement, the test chamber temperature was 26.5° C. in the second measurement, and the test chamber temperature was 26.8° C. in the third measurement. That is, FIG. 7 illustrates the evaluation of droplet stability as the environmental temperature changed by 1.2° C. over a period of about two hours. In addition, in the graph illustrated in FIG. 7, the X-axis represents the droplet frequency, and the Y-axis represents BOP (position coordinate: the larger the value, the shorter the actual BOP length).

As shown in FIG. 7, there are frequencies: one in which the BOP hardly varies for a temperature change of 1.2° C. for about two hours; and the other in which the BOP varies greatly. The former includes 85 to 92 kHz, 95 to 101 kHz, and the like, which can be said to be the frequencies that are stable with respect to the temperature change. On the other hand, the latter includes 80 to 82 kHz, 93 to 94 kHz, 105 to 106 kHz, and the like. In particular, at 105 to 106 kHz, the BOP varies greatly, and varies by about 5 mm, which can be said to be an abnormal behavior corresponding to a one-digit change in the amplitude of the vibrating element. Therefore, in a case where this level of BOP variation occurs, the conventional droplet stabilization methods may not be able to handle the situation. Specifically, in the method (i) above, in a case where the BOP variation is excessively large, the BOP variation may exceed the adjustment range of the driving voltage and become uncontrollable. Furthermore, in the method (ii) above, it is practically difficult to completely suppress the liquid temperature variation in the sheath liquid to zero.

From the above reasons, it can be said to be desirable to control the frequency with respect to temporal changes in environmental temperature or the like to control the side-stream trajectory with higher accuracy and stabilize the droplets.

2. First Embodiment (Particle Isolation Device 1)

FIG. 1 is a schematic diagram illustrating a configuration example of a first embodiment of a particle isolation device 1 according to the present technology. Furthermore, FIG. 2 is a schematic diagram illustrating another configuration example of the first embodiment of the particle isolation device according to the present technology.

Figure 2:
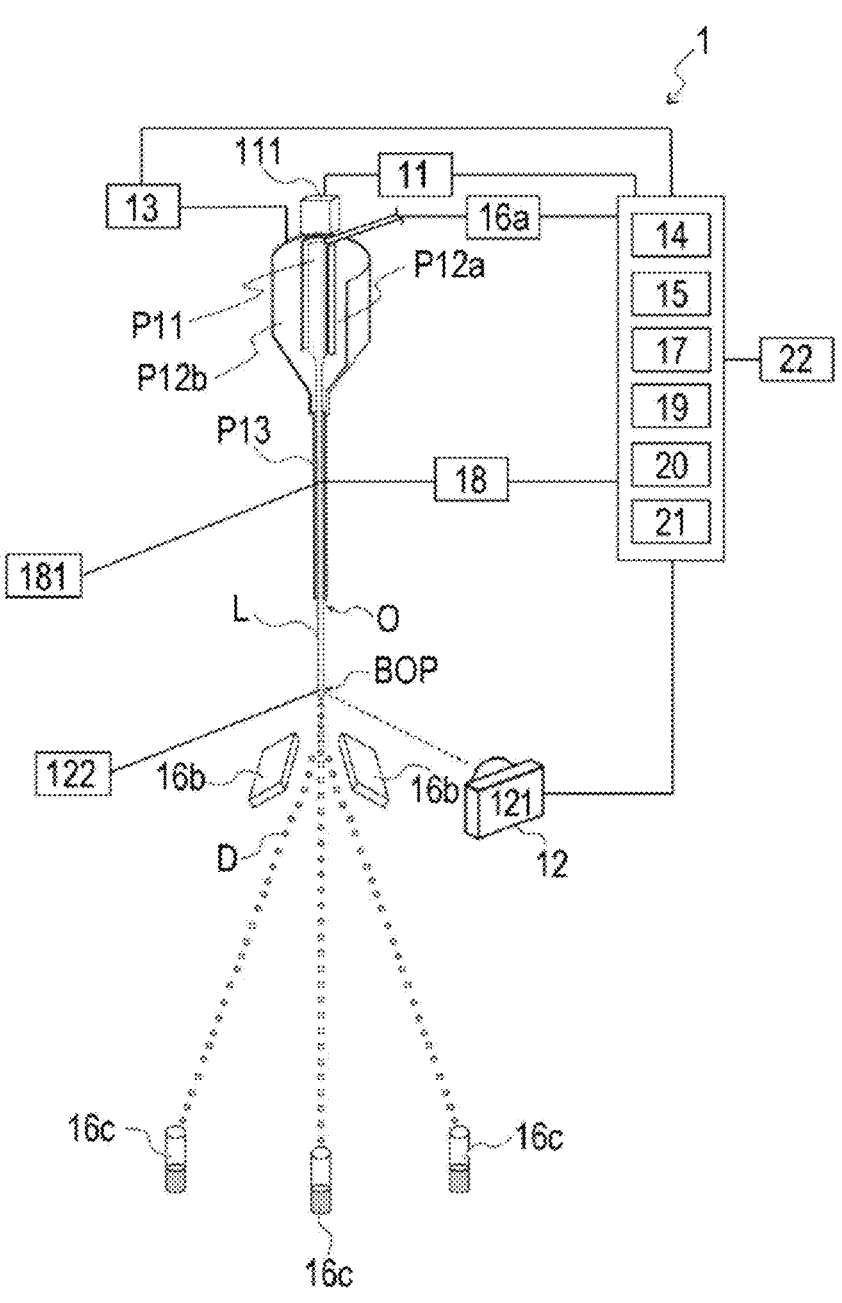
FIG. 2 is a schematic diagram illustrating another configuration example of the first embodiment of the particle isolation device according to the present technology.

The particle isolation device 1 illustrated in FIGS. 1 and 2 includes at least a vibration unit 11, an imaging unit 12, a liquid temperature control unit 13, and a frequency control unit 14. In addition, the particle isolation device 1 may include a flow path P, a determination unit 15, a charging unit 16a, a deflector plate 16b, a recovery vessel 16c, a break-off control unit 17, a detection unit 18, an analysis unit 19, a storage unit 20, a display unit 21, a user interface 22, and the like as necessary.

(1) Flow Path P

A fluid containing at least the sheath liquid flows through the flow path P. Furthermore, a sample liquid containing particles and sheath liquid flowing so as to enclose the sample liquid may flow as necessary, and in this case, the flow path P can be configured to form a flow in which the particles are aligned in a substantially linear form. The flow path P may be provided in advance in the particle isolation device 1, but it is also possible to install a commercially available flow path, a disposable chip provided with a flow path, or the like.

The form of the flow path P is also not particularly limited, and can be freely designed as appropriate. For example, the flow path is not limited to a flow path formed in a substrate such as two-dimensional or three-dimensional plastic or glass as illustrated in FIG. 1, and a flow path used in a conventional flow cytometer as illustrated in FIG. 2 can also be used.

The flow path width, the flow path depth, the flow path cross-sectional shape, and the like of the flow path P are also not particularly limited, and can be freely designed as appropriate. For example, a micro flow path having a channel width of 1 mm or less can also be used in the particle isolation device 1.

In the present technology, in particular, a micro flow path having a flow path width of about 10 μm or more and 1 mm or less can be suitably used.

(2) Vibration Unit 11

The vibration unit 11 applies vibration to the fluid containing the sheath liquid by supplying a driving voltage based on at least two or more frequencies. Thereby, the fluid can be continuously formed into droplets to generate a fluid stream (droplet flow). The plurality of frequencies may be a frequency domain designated by a user. The present embodiment can be applied to a chip system in which the entire flow path system including the nozzle as illustrated in FIG. 1 is integrated and replaceable, and a flow cell system in which a flow path system as illustrated in FIG. 2 is fixed and only the tip nozzle is replaceable.

The vibration is applied by, for example, a vibrating element 111. The vibrating element 111 is not particularly limited, and conventionally known vibrating elements can be arbitrarily selected, specifically, a piezoelectric element, and the like. In a case where the chip T is used as the flow path P, the vibrating element 111 is preferably provided near an orifice O of the chip T.

The driving voltage is supplied to the vibration unit 11 by, for example, a voltage supply unit. The driving voltage is supplied according to, for example, a sine wave in order to form a stable droplet D, and is controlled by two of a frequency (clock value) and an amplitude (drive value).

In the case of the chip system as illustrated in FIG. 1, a sheath liquid inlet and sheath liquid flow paths P12a, P12b, a sample liquid inlet and a sample liquid flow path P11, a main flow path P13 where these flow paths merge and light is emitted, the orifice O (outlet nozzle), and the like are integrated and are replaceable. The sample liquid flow path P11 is linearly disposed at the center, and the sheath liquid flow paths P12a, P12b branch to the left and right from the inlet so as to surround the sample liquid flow path P11, and the three flow paths eventually merge to become the main flow path P13. As a result, a laminar flow is formed so that the sample liquid is sandwiched by the sheath liquid, and travels to a linear flow path portion where detection by light irradiation is performed. In this case, in a case where vibration is applied to a portion of the substrate surface forming the chip T by the vibrating element 111, the droplet D is formed from the liquid column L ejected from the orifice O. Alternatively, the sheath liquid may be directly vibrated before the inlet of the chip T.

In the case of the flow cell system as illustrated in FIG. 2, the sheath liquid and the sample liquid are injected into a conical container. The conical container is installed with its apex facing vertically downward, and a tube or the like for introducing the sheath liquid is connected to the upper side surface. The upper surface of the conical container is open, and the vibrating element 111 is attached in a state of being sealed with an O-ring. The sample liquid is injected vertically from above the container. The conical container narrows at the lowermost portion, and its tip is connected to a cuvette portion in which the main flow path (linear flow path) P13 is formed. When a laminar flow is formed so that the sheath liquid surrounds the sample liquid in the conical container and the sample liquid travels to the cuvette portion as a laminar flow as it is, detection by light irradiation is performed in the main flow path P13. A detachable outlet nozzle is installed at the endpoint of the main flow path P13, and a connection portion has a sloped shape to be continuously narrowed from the cuvette outlet to the outlet nozzle. The sheath liquid and the sample liquid are slightly vibrated in the front-rear direction with respect to the flow, from the vibrating element 111 attached immediately above the conical container. Then, a liquid column L ejected from the outlet nozzle travels vertically downward while widening a crack formed at the same frequency as the vibration produced by the vibrating element 111, and is formed into droplets at the break-off position from the nozzle outlet.

(3) Imaging Unit 12

The imaging unit 12 acquires images of the fluid and the droplets at a position where the fluid is formed into the droplets through the vibration. Specifically, at the break-off position where the sheath liquid laminar flow discharged from the orifice O is formed into droplets, the images of the fluid before being formed into droplets and the droplets are captured.

Specific examples of the imaging unit 12 include a droplet camera 121, such as a charge-coupled device (CCD) camera or a complementary metal-oxide-semiconductor (CMOS) sensor, and the like. The droplet camera 121 can be disposed at a position where f the droplet D can be imaged between the orifice O and the deflector plate 16b to be described later. In addition, the droplet camera 121 can adjust the focus of the captured image of the droplet D. Examples of a light source that illuminates the imaging region in the droplet camera 121 include a strobe 122 and the like. Note that the imaging unit 12 can also obtain a photograph of a phase at a certain time, and can continuously obtain the photograph within a certain cycle. The "certain cycle" mentioned here is not particularly limited, and may be one cycle or a plurality of cycles. In the case of a plurality of cycles, each cycle may be temporally continuous or discontinuous.

The image captured by the droplet camera 121 is displayed on the display unit 21 to be described later, and can be used by the user to confirm the formation status of the droplet D (e.g., size, shape, spacing, etc. of the droplet D).

The strobe 122 may be controlled by the break-off control unit 17 to be described later. The strobe 122 includes, for example, a light-emitting diode (LED) for imaging the droplet D and a laser (e.g., red laser light source, etc.) for imaging the particles, and can be switched by the break-off control unit 17 according to the purpose of imaging or the like. The specific structure of the strobe 122 is not particularly limited, and one or two or more conventionally known circuits or elements can be appropriately and freely selected and used.

(4) Liquid Temperature Control Unit 13

The liquid temperature control unit 13 controls the liquid temperature of the sheath liquid. The liquid temperature control unit 13 may include, for example, a temperature sensor and a temperature control unit that measure the liquid temperature of the sheath liquid. The temperature sensor and the temperature control unit are connected through a circuit. The installation position of the temperature sensor is not particularly limited, and may be in direct contact with the sheath liquid. However, in order to prevent contamination, the temperature sensor is preferably installed at a position where the liquid temperature of the sheath liquid can be measured indirectly. Specifically, a material having a high thermal conductivity (e.g., metal pipe, etc.) is inserted immediately before the inlet of the flow cell or the chip T at the endpoint of the tube through which the sheath liquid flows, and the temperature sensor is installed thereon. In this case, by further covering the sensor surface with heat-insulating material so that the temperature sensor is not exposed to the outside air, the liquid temperature of the sheath liquid can be indirectly measured with high accuracy. In addition, in a case where there is a difference between the temperature detected by the temperature sensor and the target temperature to be reached, the liquid temperature control unit 13 may correct the target temperature of a temperature inspection unit to be described later in consideration of the difference.

Furthermore, in a case where the sample liquid containing the particle and the sheath liquid flow through the flow path P, the temperature sensor is preferably disposed near the flow path in which the sample liquid and the sheath liquid merge. This makes it possible to maintain the liquid temperature of the sheath liquid even after the start of sorting, and to suppress droplet instability due to the liquid temperature variation in the sheath liquid. in addition, this is because when situated too far from the vicinity of the flow path, the temperature sensor can be affected by the environmental temperature during that time. Note that, in this case, the temperature sensor may be a sensor different from the temperature sensor provided in the liquid temperature control unit 13.

The temperature control unit may include, for example, a temperature control element, a metal member disposed in contact with the temperature control element, and the temperature inspection unit that inspects the temperature of the metal member. The temperature control element is, for example, a semiconductor cold element or the like that generates a temperature difference by applying a direct current, and specific examples thereof include a Peltier element and the like. The metal member is not particularly limited and can be configured using, for example, copper, brass, or the like. The metal member can be disposed to be in contact with, for example, a tubular member that supplies the sheath liquid. The temperature inspection unit is attached to the metal member, and inspects or controls the temperature of the metal member so that the temperature reaches the target temperature. In addition, the temperature control unit may further include a heat sink and a fan.

(5) Frequency Control Unit 14

Although details will be described later, the frequency control unit 14 acquires data regarding the state of the droplet D at each frequency for each liquid temperature of the sheath liquid from the image captured by the imaging unit 12, and controls the frequency of the driving voltage on the basis of variations in the data accompanying changes in the liquid temperature of the sheath liquid.

Examples of the data regarding the state of the droplet D include the size of the droplet D, the type of satellite of the droplet D, the states of the liquid column L, the satellite droplet, and the main droplet, the bonding state between the droplet D, and the liquid column L, the distance between the droplet D and the liquid column L, the break-off position (also including the concept of "BOP length") of the droplet D, and the like, and among these, the break-off position of the droplet D is preferable.

(6) Determination Unit 15

As will be described in detail later, in a case where the difference between the break-off positions of the droplets is equal to or larger than a threshold, the determination unit 15 determines the corresponding frequency as an "unstable frequency". Furthermore, in a case where the difference between the break-off positions of the droplets is less than the threshold, the determination unit 15 may determine that the corresponding frequency is a "stable frequency". Moreover, the frequency at which the difference between the break-off positions of the droplets is the smallest may be determined as the "most stable frequency".

(7) Charging Unit 16a, Deflector Plate 16b, Recovery Vessel 16c

The charging unit 16a charges the droplet D including the target particle discharged from the orifice O. In the present technology, the droplet D containing the target particle is formed by supply of a driving voltage based on a frequency other than the frequency determined as the "unstable frequency" by the determination unit 15 described above. This allows for the elimination of an unstable frequency in advance, enabling sorting in a state where the droplets are stabilized.

In the present technology, "particles" can broadly include biologically relevant particles such as cells, microorganisms, and ribosomes, or synthetic particles such as latex particles, gel particles, and industrial particles, and the like. Furthermore, in the present technology, the particles can be contained in a fluid such as a liquid sample.

The biologically relevant particles may include chromosomes forming various cells, ribosomes, mitochondria, organelles (cell organelles) and the like. The cells may include animal cells (for example, blood cells, etc.) and plant cells. The microorganisms may include bacteria such as *Escherichia coli*, viruses such as tobacco mosaic virus, fungi such as yeast, and the like. Furthermore, the biologically relevant particles may also include biologically relevant polymers such as nucleic acids, proteins, and composites of these, for example.

The industrial particles may be, for example, an organic or inorganic polymer material, metal, or the like. The organic polymer material may include polystyrene, styrene/divinylbenzene, polymethyl methacrylate, and the like. The inorganic polymer material may include glass, silica, magnetic material, and the like. The metal may include gold colloid, aluminum, and the like. In general, shapes of these particles are normally spherical, but may be non-spherical in the present technology, while the size, mass, and the like thereof are also not particularly limited.

In the present technology, among these particles, biologically relevant particles are preferable.

In the present technology, the particles may be labeled with one or two or more dyes such as fluorescent dyes. In this case, the available fluorescent dyes include for example, Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421) and the like.

As a method for isolating the droplet D containing the target particle, for example, the droplet D, generated through the vibration from the vibration unit 11 described above, is positively or negatively charged by the charging unit 16a as necessary on the basis of a detection signal obtained from light irradiation by a light source 181 to be described later, and the traveling direction of the droplet D2 is controlled by the presence or absence and the magnitude of an electrical force between the deflector plates 16b, and guided to a predetermined recovery vessel 16c.

The charging unit 16a may include a charging electrode, a voltage source that applies a desired voltage to the electrode, and the like. The charging electrode can be disposed to be electrically in contact with the sheath liquid flowing through the flow path P, and can be inserted into the charge electrode inlet of the chip T, for example, as illustrated in FIG. 1.

The deflector plates 16b deflect the traveling direction of each droplet D in the fluid stream by an electrical force acting between the deflector plates and the charge applied to the droplet D, and guide the droplet D to the predetermined recovery vessel 16c or the like, and are disposed to face each other across the fluid stream S. In FIG. 1, the facing direction of the deflector plates 16b is indicated by the X-axis direction. The deflector plate 16b is not particularly limited, and conventionally known electrodes and the like can be used. Positive or negative different voltages are applied to the deflector plates 16b, and when the charged droplet D passes through an electric field formed by them, an electric force (Coulomb force) is generated, and each droplet D is attracted in a direction toward either deflector plate 16b.

A plurality of recovery vessels 16c can be arranged in a substantially linear form in the facing direction of the deflector plate 16b (X-axis direction in FIG. 1). The recovery vessel 16c is not particularly limited, and examples thereof include a plastic tube, a glass tube, and the like. The number of recovery vessels 16c is also not particularly limited, and FIGS. 1 and 2 each illustrate an example in which three recovery vessels are installed. Note that the recovery vessel 16c may be installed in a recovery vessel container (not illustrated) in a replaceable manner. Specifically, for example, the recovery vessel container can be disposed on a Z-axis stage (not illustrated) configured to be movable in a direction (Z-axis direction in FIG. 1) orthogonal to the discharging direction (Y-axis direction in FIG. 1) of the droplet D from the orifice O and the facing direction (X-axis direction in FIG. 1) of the polarizing plates 16b.

(8) Break-Off Control Unit 17

The break-off control unit 17 controls the break-off of the droplet D containing the target particle on the basis of the image of the state of the droplet D containing the particle acquired by the imaging unit 12. Specifically, the driving voltage of the vibrating element 111 is adjusted on the basis of the break-off timing of the droplet D containing the particles specified by a plurality of droplet observation images captured by the imaging unit 12, whereby the bonding state between the droplet D and the liquid column L and/or the distance between the droplet D and the liquid column L and the break-off position of the droplet D are controlled to remain constant. As a result, by constantly applying feedback to the driving voltage to adjust the droplets, it is possible to suppress droplet instability after the start of sorting.

(9) Detection Unit 18

The detection unit 18 detects measurement target light generated from particles in a fluid flowing through the flow path P by irradiation with light emitted from the light source 181. Specifically, by irradiation of the particles with light, which are delivered while being aligned in a substantially linear form at the center of the three-dimensional laminar flow in the main flow path P13, the detection unit 18 detects measurement target light generated from the particles.

The light source 181 may include a plurality of light sources, and in this case, the particles in the fluid flowing through the flow path P can be irradiated with light from the plurality of light sources. In addition, each of the plurality of light sources may emit light with the same wavelength or may emit light with a different wavelength.

The type of light emitted from the light source 181 is not particularly limited, but in order to reliably generate light from the particles, light having a constant light direction, wavelength, and light intensity is desirable. Specific examples thereof include a laser beam, an LED, and the like.

Examples of the laser light include a semiconductor laser, an argon ion (Ar) laser, a helium-neon (He—Ne) laser, a dye laser, a krypton (Cr) laser, a solid-state laser in which a semiconductor laser and a wavelength conversion optical element are combined, and the like, and two or more thereof can be used in combination.

The detection unit 18 includes at least one photodetector that detects the measurement target light. Examples of the measurement target include fluorescence, scattered light (e.g., forward scattered light, backward scattered light, side scattered light, Rayleigh scattering, Mie scattering, etc.), and the like. Each photodetector includes one or more light-receiving elements, and has a light-receiving element array, for example. Each photodetector may include one or a plurality of photodiodes such as a photomultiplier tube (PMT) and/or an avalanche photodiode (APD) and a multi-pixel photon counter (MPPC) as the light-receiving element. The photodetector may include, for example, a PMT array in which a plurality of PMTs is arranged in a one-dimensional direction. Furthermore, the detection unit 18 may include an imaging element such as a charge-coupled device (CCD) or a complementary metal-oxide-semiconductor (CMOS). The measurement target light is converted into an electric signal by the photodetector, and the electric signal is output to the determination unit 15 and the break-off control unit 17 described above, the analysis unit 19 to be described later, and the like, and used for characteristic determination of each particle.

In addition to the light source 181, the detection unit 18 may include a light-guiding optical system for guiding a plurality of lights to a predetermined position, a detection optical system for causing light with a predetermined detection wavelength to reach a corresponding photodetector, and the like. The light-guiding optical system may include, for example, optical components such as a beam splitter group, a mirror group, and an optical fiber. Furthermore, the light-guiding optical system may include a lens group for collecting the multiplexed excitation light, and may include, for example, an objective lens. The detection optical system may include a spectroscopic unit such as a prism or a diffraction grating, or a wavelength separation unit such as a dichroic mirror or an optical filter.

Note that the detection unit 18 may magnetically or electrically detect the characteristics of the particles. In this case, for example, microelectrodes are arranged in the main flow path P13 of the chip T to face each other, and a resistance value, a capacity value (capacitance value), an inductance value, an impedance, a change value of an electric field between the electrodes, or magnetization, a change in magnetic field, a change in flux density, or the like can be detected.

(10) Analysis Unit 19

The analysis unit 19 is connected to the imaging unit 12, the detection unit 18, and the like described above, and performs analysis on the basis of an image acquired by the imaging unit 12, an electric signal detected by the detection unit 18, and the like.

Specifically, the analysis unit 19 analyzes or calculates the data regarding the state of the droplet D described above from the image acquired by the imaging unit 12. In addition, from the data regarding the state of the droplet D, the BOP variation amount ΔBOP (difference in break-off position), and the like may be obtained.

Furthermore, the analysis unit 19 can correct the detection value detected by the detection unit 18 and calculate the feature amount of each particle. For example, the feature amount, such as the size, form, internal structure, and the like of the particle, is calculated from the detection value of the received fluorescence or scattered light. Furthermore, an isolation control signal can be generated by performing isolation determination on the basis of the calculated feature amount, an isolation condition received from the user interface 22 described later, and the like. By controlling the charging unit 16a described above on the basis of the isolation control signal, particles of a specific type can be isolated and collected.

The analysis unit 19 may be included in a housing provided with the detection unit 18 and the like, or may be outside the housing. Furthermore, the particle isolation device 1 according to the present embodiment is not essential, and an external analysis device or the like can also be used. In addition, the analysis unit 19 may be connected to each unit of the particle isolation device 1 via a network.

(11) Storage Unit 20

The storage unit 20 stores all items related to analysis and isolation, such as a detection value detected by the detection unit 18, a feature amount calculated by the analysis unit 19, a generated isolation control signal, and an isolation condition and the like input by the user interface 22.

The storage unit 20 may be included in a housing in which the detection unit 18 and the like are provided, or may be outside the housing. Furthermore, the storage unit 20 is not essential to the particle isolation device 1 according to the present embodiment, and an external storage device (e.g., a hard disk, etc.) or the like can also be used. In addition, the storage unit 20 may be connected to each unit of the particle isolation device 1 via a network.

(12) Display Unit 21

The display unit 21 can display all items related to analysis and isolation, and for example, can display the feature amount of each particle calculated by the analysis unit 19 as a histogram or the like. Furthermore, it is also possible to display an image or the like captured by the imaging unit 12.

The display unit 21 is not essential in the particle isolation device 1 according to the present embodiment, and an external display device (e.g., display, printer, personal digital assistant, etc.) or the like can also be used. In addition, the display unit 21 may be connected to each unit of the particle isolation device 1 via a network.

(13) User Interface 22

The user interface 22 is a part to be operated by the user. The user can input various data via the user interface 22 and access each unit of the particle isolation device 1 to control each unit. For example, a region of interest is set for a histogram or the like displayed on the display unit 21 via the user interface 22, and an isolation condition and the like are determined.

The user interface 22 is not essential in the particle isolation device 1 according to the present embodiment, and an external operating device (e.g., a mouse, a keyboard, a personal digital assistant, etc.) or the like can also be used. In addition, the user interface 22 may be connected to each unit of the particle isolation device 1 via a network.

(14) Others

Note that a function performed in each unit of the particle isolation device 1 according to the present technology can also be stored as a program in a general-purpose computer, a control unit including a CPU and the like, and a hardware resource including a recording medium such as non-volatile memory (e.g., USB memory, etc.), HDD, and CD, and the function can be executed. Furthermore, the function may be realized by a server computer or a cloud connected via a network.

3. Example of Control Flow

Figure 8:
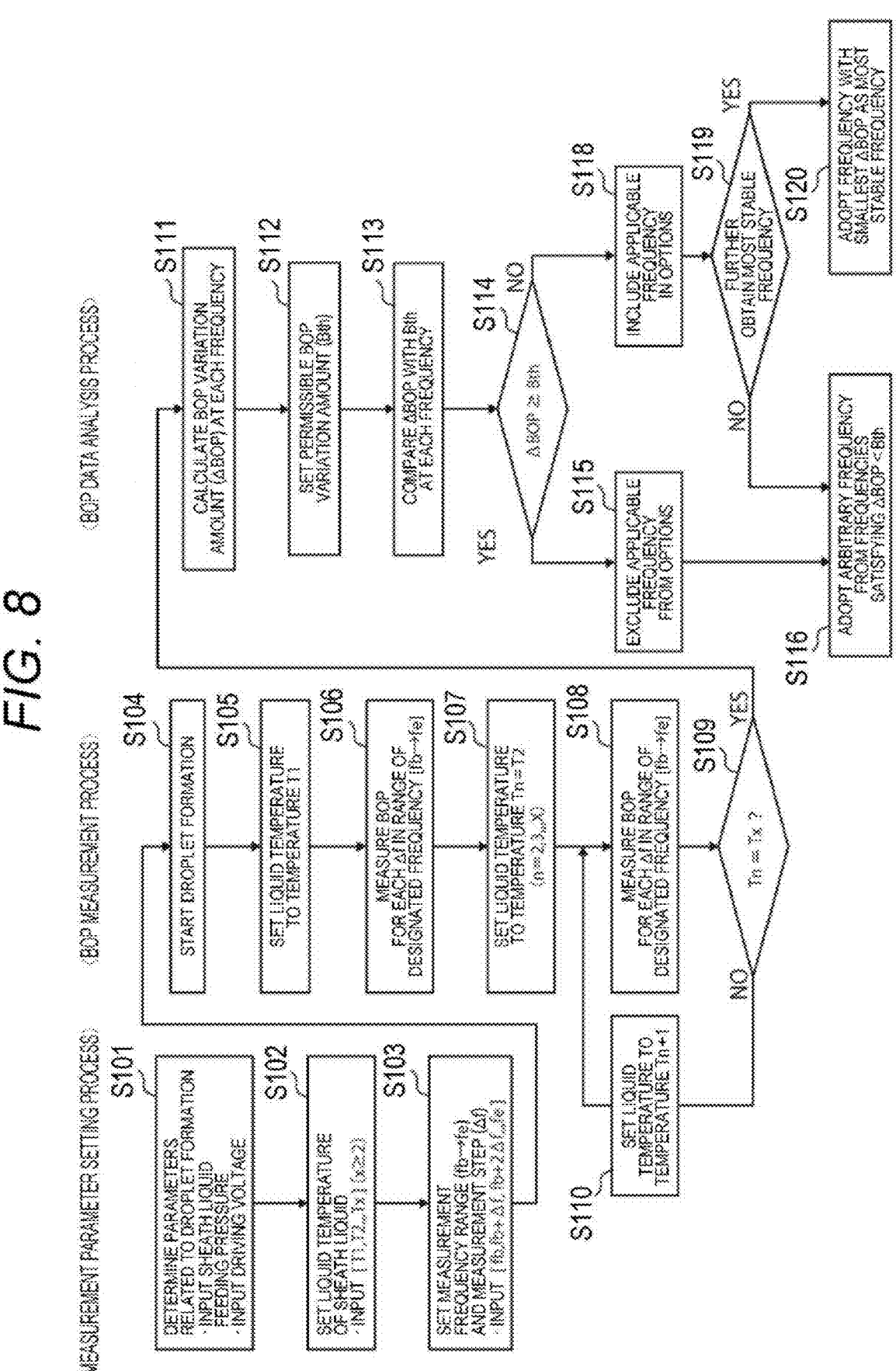
FIG. 8 is a flowchart illustrating an example of control by the particle isolation device according to the present technology.
Figure 9:
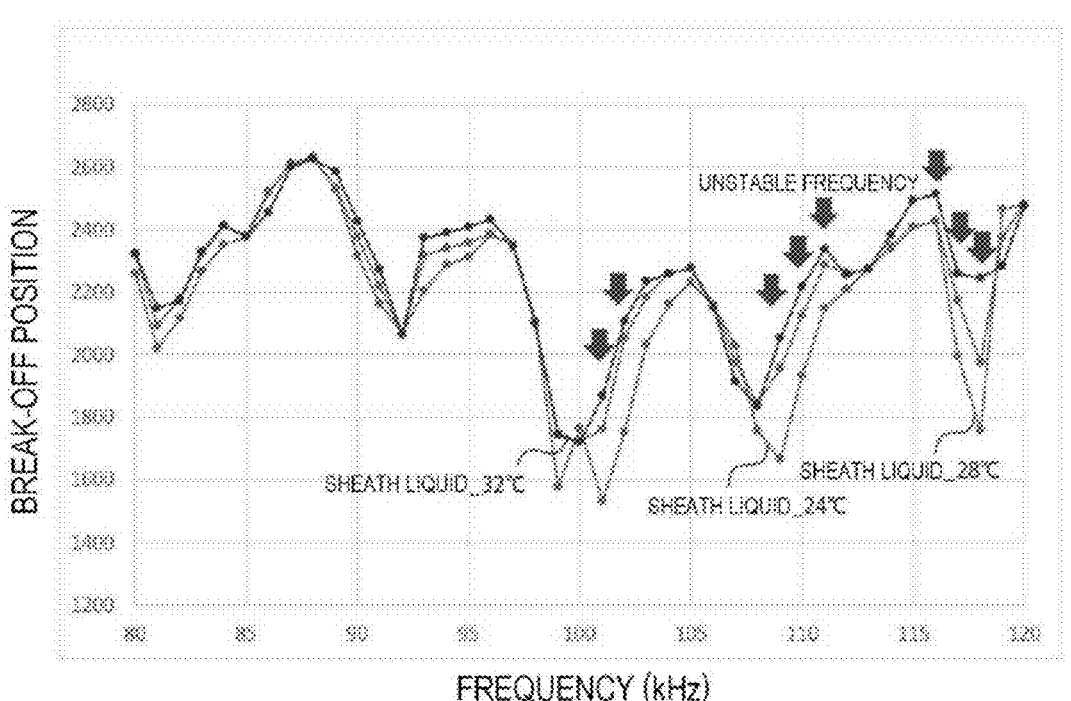
FIG. 9 is a diagram illustrating the state of the control example by the particle isolation device according to the present technology.

Next, an example of control executed by the particle isolation device 1 according to the embodiment illustrated in FIGS. 1 and 2 will be described. FIG. 8 is a flowchart illustrating the control example. Furthermore, FIG. 9 is a diagram illustrating the state of the control example, and downward arrow portions all indicate unstable frequencies. Note that the execution of the operation to be described later may be controlled by a control unit (not illustrated) or the like that controls the particle isolation device 1.

A control flow example described below coexists with the conventional droplet stabilization method described above, and may be inserted, for example, in a preceding stage of the conventional method. In this case, the burden in the conventional droplet stabilization method can be reduced, and the effects of these methods can be further exhibited.

(1) Measurement Parameter Setting Process (Steps S101 to S103)

First, parameters related to droplet formation other than the frequency (mainly sheath liquid feeding pressure and driving voltage) are determined (step S101). At this time, the sheath liquid feeding pressure is preferably the same as that at the time of sorting. On the other hand, the driving voltage is adjusted again in accordance with the frequency selected before the start of sorting, and hence the driving voltage is not necessarily the same at this stage.

Next, in order to measure the break-off position by changing the liquid temperature of the sheath liquid in several stages, a plurality of liquid temperature set values of

[T1, T2, . . . , Tx] (x≥2) is input (step S102). At this time, when the number of points of the liquid temperature set value is excessively increased, it takes time to stabilize the temperature when the liquid temperature set value is changed, which will increase the time required. Therefore, unless it is particularly necessary to investigate BOP variation in detail, for example, three points of maximum, center, and minimum values may be input within a range of an assumed temperature variation (e.g., ±3° C.) with respect to room temperature at the start of measurement or a predetermined set value. In the example illustrated in FIG. 9, the liquid temperature of the sheath liquid is set in three stages of 24° C., 28° C., and 32° C.

Next, the measurement start frequency (fb), measurement end frequency (fe), and the measurement frequency step (Δf) are set (step S103). In general, when the nozzle diameter and the sheath liquid feeding pressure are determined, an optimum frequency fs based on physical properties (surface tension) exists, and it is thus preferable to investigate a range of ±10 to 20% around this fs. Also, in step S103, similarly to step S102, when the frequency range is excessively widened or the frequency step is excessively finer, the number of BOP measurement points increases, which will require excessive time. Therefore, depending on the speed of BOP measurement, for example, the number of BOP measurement points may be set to about 10 per sheath liquid temperature point.

(2) BOP Measurement Process (Steps S104 to S110)

With each parameter (sheath liquid feeding pressure, driving voltage, and measurement start frequency fb) input in the measurement parameter setting process described above, the vibration unit 11 applies vibration to the fluid containing only the sheath liquid to form the droplet D (step S104). Note that, in this BOP measurement process, only the sheath liquid may be allowed to flow through the flow path P, and it is not necessary to allow the sample liquid containing the particles to flow through the flow path P.

Next, the liquid temperature control unit 13 sets the liquid temperature of the sheath liquid to a temperature T1 and waits for the liquid temperature to stabilize (step S105). When the liquid temperature stabilizes, data of the break-off position is acquired for each designated frequency [fb, fb+Δf, fb+2Δf, . . . , fe] (step S106). The data can be acquired by analyzing an image captured by the imaging unit 12 in the analysis unit 19. Furthermore, in a case where the BOP can be tracked by moving the position of the droplet camera 121, the BOP can be calculated by assigning the Z position of the camera 121.

Next, the liquid temperature control unit 13 sets the liquid temperature of the sheath liquid to a temperature T2, and waits for the liquid temperature to stabilize again (step S107). When the liquid temperature stabilizes, data of the break-off position is acquired again for each designated frequency [fb, fb+Δf, fb+2Δf, . . . , fe] (step S108).

Thereafter, the liquid temperature of the sheath liquid is set to a temperature Tn+1 (steps S109 to S110) and step S108 is repeated until the liquid temperature of the sheath liquid reaches a temperature Tx.

(3) BOP Data Analysis Process (Steps S111 to S120)

The analysis unit 19 performs analysis using the data of the break-off position obtained in the BOP measurement process described above, and the BOP variation amount (ΔBOP) (difference in break-off position) due to the liquid temperature change [T1, T2, . . . , Tx] of the sheath liquid at each frequency is obtained (step S111). Next, a permissible BOP variation amount (Bth) is set (step S112). For example, in a case where the droplet stabilization control is performed by feedback to the driving voltage, there is a risk that the voltage exceeds the output voltage range when a large voltage variation range of about ±50% with respect to the initial value of the driving voltage is required. Therefore, Bth is set in consideration of BOP variation for one droplet before and after, which is a range in which the side-stream trajectory can be easily stabilized by the feedback control. Specifically, for example, since it is known that the standard droplet spacing is about nozzle diameter×4.5, Bth can be arbitrarily determined from the relationship with the nozzle diameter used for measurement. In the example illustrated in FIG. 9, Bth=0.6 mm is set.

Next, determination unit 15 compares ΔBOP with Bth at each frequency (step S113). When ΔBOP≥Bth (YES in step S114), the determination unit 15 determines that the corresponding frequency is an "unstable frequency", and on the basis of the determination result, the frequency control unit 14 excludes the unstable frequency from the options of frequency that can be adopted as the frequency of the driving voltage (step S115). On the other hand, in a case where ΔBOP<Bth (NO in step S114), the determination unit 15 determines that the corresponding frequency is a "stable frequency", and on the basis of the determination result, the frequency control unit 14 may include the stable frequency in the options of the frequency that can be adopted as the frequency of the driving voltage (step S118). That is, the frequency control unit 14 may use any frequency other than the unstable frequency excluded in step S115 as the stable frequency. This enables the side-stream trajectory to stabilize. In the example illustrated in FIG. 9, the frequency indicated by the downward arrow is the frequency determined as the "unstable frequency".

In addition, examples of other criteria for selecting the frequency include an event rate, an occurrence probability of a doublet (a state in which a plurality of particles is included in one droplet), and the like with respect to sorting performance. Moreover, with regard to the droplets, there are indicators that an appropriate break-off position can be obtained at an appropriate driving voltage, a state of fast auroral snapshot explorer (FAST) satellite having higher stability of the side-stream trajectory is likely to occur, and the like. Therefore, the user can comprehensively determine these and determine the final frequency.

Alternatively, in a case where the device has an existing frequency selection algorithm, the unstable frequency may be excluded in step S115, and then the processing may be continuously performed. An example of the algorithm is a method described in Japanese Patent Application Laid-Open No. 2020-76786 A. In this method, it is used as a guideline for frequency selection that the BOP length is as short as possible and the satellite is collected in the main droplet within an arbitrary designated distance range. By using the algorithm in combination with the present technology, the stability of the side-stream trajectory over time can be guaranteed.

Next, in a case where the user wants to emphasize the droplet stability, the most stable frequency is obtained from the options of the stable frequency (YES in step S119), and the frequency control unit 14 can adopt a frequency with the smallest ΔBOP as the most stable frequency (step S120). This is useful, for example, in a case where the reliability of the accuracy of the liquid temperature control of the sheath liquid is low (e.g., in a case where the change in environmental temperature may be large and exceed the processing capacity of the temperature control unit 13, etc.) or other cases. Specifically, the actual device is often used in a sealed environment of the safety cabinet, and the temperature in the cabinet may continue to rise over time due to heat dissipation from the temperature control unit 13 or the like. Therefore, it is particularly effective to adopt the most stable frequency in an environment where such a liquid temperature variation is concerned.

Note that a plurality of most stable frequencies may exist in a case where ΔBOP is similarly small at each of the frequencies.

On the other hand, in a case where the user wants to emphasize the sorting performance, an appropriate frequency can be adopted from the options of each stable frequency satisfying ΔBOP<Bth (step S116).

(4) Effects

Through the above process, a frequency that is unstable with respect to a temporal change in environmental temperature can be detected in advance and excluded from the options of the frequency that can be adopted as the frequency of the driving voltage. Therefore, a constant side-stream trajectory can be maintained for a long period of time. In addition, in the case of using a combination of conventional droplet stability control means such as feedback control to a driving voltage as described in Patent Document 1 above and temperature control of the sheath liquid as described in Patent Document 2 above, it is possible to reduce the burdens of these methods, provide stronger droplet stability, maintain a constant side-stream trajectory for a long period of time, and stably guide the particles to be sorted into the recovery vessel.

In addition, when necessary, the frequency that is most stable against the change in environmental temperature within a designated frequency range can be investigated before sorting. For example, even in a case where the change in environmental temperature is large, the processing capacity of the temperature control unit 13 cannot cope with the change, and a constant liquid temperature cannot be maintained, it is possible to stabilize the droplets by selecting the frequency in combination with feedback control to the driving voltage of the vibrating element.

Moreover, in a case where the device has an existing frequency selection algorithm, it is possible to automatically determine a more optimized frequency by excluding the unstable frequency before performing the processing.

In addition, depending on the setting conditions, the series of control flows described above can be easily executed in a required time of about 20 minutes, so that even in a case where the device is different, the environmental temperature changes, or the state of the device changes, stable operation can be reliably realized by selecting the optimum frequency each time before sorting is performed,

4. Second Embodiment (Particle Isolation Method)

The particle isolation method according to the present embodiment performs at least a vibration step, an imaging step, a liquid temperature control step, and a frequency control step. Furthermore, a determination step, a charging step, and the like may be performed as necessary. Note that a specific method performed in each step is similar to the method performed in each unit of the particle isolation device 1 according to the first embodiment described above, and thus the description thereof is omitted here.

In the particle isolation method according to the present embodiment, a charging step of charging a droplet containing the target particle is performed after the determination step. In the charging step, the droplet containing the target particle is formed through vibration caused by supply of a driving voltage based on a frequency other than the unstable frequency. That is, by performing the determination step before the start of sorting, it is possible to cope with an error for each device, a change in environmental temperature, the state change of the device, and the like, and to isolate particles with higher accuracy.

However, in a case where the state and the like of the device remain unchanged, the tendency of the frequency behavior is maintained, so that it is not always necessary to execute the determination step each time before starting sorting. On the other hand, for example, in a case where the orifice O of the chip T is removed due to cleaning or replacement, or in a case where the component of the flow cell is replaced, the determination step is preferably performed whenever possible. In particular, in a case where the chip system is adopted, it is recommended to perform the process after loading a new chip T because individual differences in the chip T and chucking reproducibility can be factors that change the tendency of the frequency behavior.

EXAMPLES

The present technology will be described in more detail below on the basis of examples. Note that examples to be described below illustrate examples of representative embodiments of the present technology, and the scope of the present technology is not narrowed by them.

<1> Test Method

The unstable frequency and the most stable frequency were searched using the flow cell system as illustrated in FIG. 2.

With the nozzle diameter set to 70 μm and the liquid feeding pressure to 600 kPa, a jet flow velocity of 30.0 m/s was obtained. The piezoelectric driving voltage was fixed (amplitude ±8 nm), and the BOP length was measured in a range of 100±20 kHz (Step_Δf=1 kHz).

The sheath liquid temperature was set in five stages (T1=23° C., T2=24° C., T3=25° C., T4=26° C., T5=27° C.).

<2> Test Results

Figure 10:
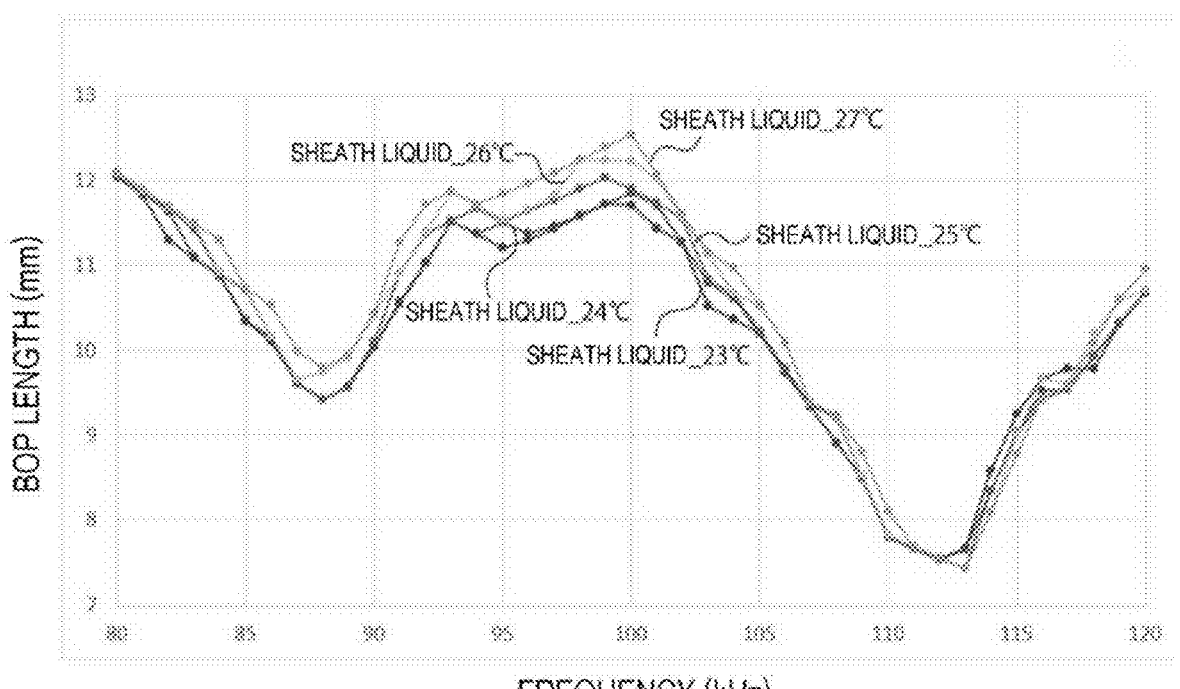
FIG. 10 is a diagram illustrating variation results of the break-off point (BOP) length depending on a liquid temperature of sheath liquid.

FIG. 10 illustrates variation results of the BOP length depending on the liquid temperature of the sheath liquid at each frequency. Note that, since the vertical axis of this graph is "BOP length (BOP length)", the lower side of the graph is shorter than that in FIG. 9.

The results shown in FIG. 10 indicate that there are large and small ΔBOPs, and that frequency bands with large BOP variations exist around 95 to 100 kHz, while frequencies with almost no BOP variations exist around 80 kHz and 112 kHz.

<3> Detection of Unstable Frequency

A threshold (Bth) for determining the unstable frequency was set to about one droplet before and after the unstable frequency, and here, Bth=0.65 mm. As a result, the following frequencies satisfying ΔBOP≥Bth were detected as unstable frequencies.

91, 92 kHz 96 to 100 kHz

Therefore, by selecting frequencies other than these unstable frequencies, the side-stream trajectory can be stabilized with high accuracy during the measurement time.

<4> Determination of Most Stable Frequency

For all frequencies within 100±20 kHz investigated, the frequency with the smallest ΔBOP was 111 kHz. That ΔBOP is 26 μm, which is considered to be a change almost equivalent to the flow velocity variation because ΔBOP tends to increase with an increase in liquid temperature. Therefore, considering the measurement error of the BOP, 80 kHz, 107 kHz, and 112 kHz with ΔBOP<100 μm can also be regarded as having similar stability, and are candidates as options of the most stable frequency. In a case where the droplet stability with respect to the temperature is most important during sorting, the frequency at the time of measurement is determined from these most stable frequencies.

<5> Others

Note that the time required for measuring the BOP length was 12 minutes per temperature parameter stage in this test example. The breakdown was four minutes of stabilization time for each 1° C. increase in sheath liquid temperature, and eight minutes of automatic measurement time for each 41-point frequency measurement.

The number of measurement points of the frequency can be reduced, and can be set to, for example, ±12 kHz ($\Delta f$=2 kHz). In this case, the number of measurement points is 13, which is about one-third of the original number, so that the automatic measurement time is reduced to about 2 minutes and a half. Furthermore, for example, when the temperature setting is set in three stages, the required time can be further shortened.

Note that the present technology can also adopt the following configurations.

[1]

A particle isolation device including:

a vibration unit that applies vibration to a fluid containing sheath liquid by supplying a driving voltage based on each of a plurality of frequencies;

an imaging unit that acquires, at a position where the fluid is formed into droplets through the vibration, an image of the fluid and each of the droplets;

a liquid temperature control unit that controls a liquid temperature of the sheath liquid; and a frequency control unit that acquires data regarding a state of the droplet at each of the frequencies per liquid temperature of the sheath liquid from the image captured by the imaging unit, and controls the frequency of the driving voltage on the basis of a variation in the data accompanying a change in the liquid temperature of the sheath liquid.

[2]

The particle isolation device according to [1], in which the data is data of a break-off position of the droplet at each of the frequencies.

[3]

The particle isolation device according to [2], in which the frequency control unit compares the break-off position of the droplet per liquid temperature of the sheath liquid.

[4]

The particle isolation device according to [3], in which the frequency control unit controls the frequency of the driving voltage on the basis of a difference in the break-off position of the droplet between the liquid temperatures of the sheath liquid.

[5]

The particle isolation device according to [4], further including a determination unit that determines an applicable frequency as an unstable frequency in a case where the difference in the break-off position of the droplet is equal to or greater than a threshold.

[6]

The particle isolation device according to [5], in which the frequency control unit excludes the unstable frequency from options of a frequency that can be adopted as the frequency of the driving voltage.

[7]

The particle isolation device according to any one of [4] to [6], further including a determination unit that determines an applicable frequency as a stable frequency in a case where the difference in the break-off position of the droplet is less than a threshold.

[8]

The particle isolation device according to [7], in which the frequency control unit adopts, as the frequency of the driving voltage, a frequency at which the difference in the break-off position of the droplet is the smallest.

[9]

The particle isolation device according to [6], further including a charging unit that charges a droplet containing a particle that is a target, in which the droplet containing the particle is formed through vibration caused by supply of a driving voltage based on a frequency other than the unstable frequency.

[10]

The particle isolation device according to [9], in which the liquid temperature control unit includes a temperature sensor disposed near a flow path in which a sample liquid containing the particle and the sheath liquid merge.

[11]

The particle isolation device according to [9] or [10] in which the imaging unit acquires an image of a state of the droplet containing the particle, and the particle isolation device further includes a break-off control unit that controls break-off of the droplet containing the particle on the basis of the image of the state captured by the imaging unit.

[12]

The particle isolation device according to any one of [9] to [11], in which the particle is a biologically relevant particle.

[13]

A particle isolation method including:

a vibration step of applying vibration to a fluid containing sheath liquid by supplying a driving voltage based on each of a plurality of frequencies;

an imaging step of acquiring, at a position where the fluid is formed into droplets through the vibration, an image of the fluid and each of the droplets;

a liquid temperature control step of controlling a liquid temperature of the sheath liquid; and a frequency control step of acquiring data regarding a state of the droplet at each of the frequencies per liquid temperature of the sheath liquid from the image captured by the imaging unit, and controls the frequency of the driving voltage on the basis of a variation in the data accompanying a change in the liquid temperature of the sheath liquid.

[14]

The particle isolation method according to [13], further including a determination step of determining an applicable frequency as an unstable frequency in a case where the difference in the break-off position of the droplet is equal to or greater than a threshold.

[15]

The particle isolation method according to [14], further including, after the determination step, a charging step of charging a droplet containing a particle that is a target, in which the droplet is formed through vibration caused by supply of a driving voltage based on a frequency other than the unstable frequency.

[16]

A program for causing a particle isolation device to execute functions of:

applying vibration to a fluid containing sheath liquid by supplying a driving voltage based on each of a plurality of frequencies;

acquiring, at a position where the fluid is formed into droplets through the vibration, an image of the fluid and each of the droplets;

controlling a liquid temperature of the sheath liquid; and acquiring data regarding a state of the droplet at each of the frequencies per liquid temperature of the sheath liquid from the image captured, and controlling the frequency of the driving voltage on the basis of a variation in the data accompanying a change in the liquid temperature of the sheath liquid.

REFERENCE SIGNS LIST

1 Particle isolation device
11 Vibration unit
111 Vibrating element
12 Imaging unit
121 Droplet camera
122 Strobe
13 Liquid temperature control unit
14 Frequency control unit
15 Determination unit
16a Charging unit
16b Deflector plate
16c Recovery vessel
17 Break-off control unit
18 Detection unit
181 Light source
19 Analysis unit
20 Storage unit
21 Display unit
22 User interface
P Flow path
T Chip
P11 Sample liquid flow path
P12a, P12b Sheath liquid flow path
P13 Main flow path
D Droplet
BOP Break-off position
O Orifice
L Liquid column

The invention claimed is:

1. A particle isolation device comprising:

a vibration unit that applies vibration to a fluid containing sheath liquid by supplying a driving voltage based on each of a plurality of frequencies;

an imaging unit that acquires, at a position where the fluid is formed into droplets through the vibration, an image of the fluid and each of the droplets;

a liquid temperature control unit that controls a liquid temperature of the sheath liquid; and a frequency controller that acquires data regarding a state of the droplet at each of the frequencies per liquid temperature of the sheath liquid from the image captured by the imaging unit, and controls the frequency of the driving voltage on a basis of a variation in the data accompanying a change in the liquid temperature of the sheath liquid.

2. The particle isolation device according to claim 1, wherein the data is data of a break-off position of the droplet at each of the frequencies.

3. The particle isolation device according to claim 2, wherein the frequency controller compares the break-off position of the droplet per liquid temperature of the sheath liquid.

4. The particle isolation device according to claim 3, wherein the frequency controller controls the frequency of the driving voltage on a basis of a difference in the break-off position of the droplet between the liquid temperatures of the sheath liquid.

5. The particle isolation device according to claim 4, further comprising a determination unit that determines an applicable frequency as an unstable frequency in a case where the difference in the break-off position of the droplet is equal to or greater than a threshold.

6. The particle isolation device according to claim 5, wherein the frequency controller excludes the unstable frequency from options of a frequency that can be adopted as the frequency of the driving voltage.

7. The particle isolation device according to claim 6, further comprising a charging unit that charges a droplet containing a particle that is a target, wherein the droplet containing the particle is formed through vibration caused by supply of a driving voltage based on a frequency other than the unstable frequency.

8. The particle isolation device according to claim 7, wherein the liquid temperature control unit includes a temperature sensor disposed near a flow path in which a sample liquid containing the particle and the sheath liquid merge.

9. The particle isolation device according to claim 7, wherein the imaging unit acquires an image of a state of the droplet containing the particle, and the particle isolation device further comprises a break-off control unit that controls break-off of the droplet containing the particle on a basis of the image of the state captured by the imaging unit.

10. The particle isolation device according to claim 7, wherein the particle is a biologically relevant particle.

11. The particle isolation device according to claim 4, further comprising a determination unit that determines an applicable frequency as a stable frequency in a case where the difference in the break-off position of the droplet is less than a threshold.

12. The particle isolation device according to claim 11, wherein the frequency controller adopts, as the frequency of the driving voltage, a frequency at which the difference in the break-off position of the droplet is the smallest.

13. A particle isolation method comprising:

a vibration step of applying vibration to a fluid containing sheath liquid by supplying a driving voltage based on each of a plurality of frequencies;

an imaging step of acquiring, at a position where the fluid is formed into droplets through the vibration, an image of the fluid and each of the droplets;

a liquid temperature control step of controlling a liquid temperature of the sheath liquid; and a frequency control step of acquiring data regarding a state of the droplet at each of the frequencies per liquid temperature of the sheath liquid from the image captured by the imaging step, and controls the frequency of the driving voltage on a basis of a variation in the data accompanying a change in the liquid temperature of the sheath liquid.

14. The particle isolation method according to claim 13, further comprising a determination step of determining an applicable frequency as an unstable frequency in a case where a difference in a break-off position of the droplet is equal to or greater than a threshold.

15. The particle isolation method according to claim 14, further comprising, after the determination step, a charging step of charging a droplet containing a particle that is a target, wherein the droplet is formed through vibration caused by supply of a driving voltage based on a frequency other than the unstable frequency.

16. A program for causing a particle isolation device to execute functions of:

applying vibration to a fluid containing sheath liquid by supplying a driving voltage based on each of a plurality of frequencies;

acquiring, at a position where the fluid is formed into droplets through the vibration, an image of the fluid and each of the droplets;

controlling a liquid temperature of the sheath liquid; and acquiring data regarding a state of the droplet at each of the frequencies per liquid temperature of the sheath liquid from the image captured, and controlling the frequency of the driving voltage on a basis of a variation in the data accompanying a change in the liquid temperature of the sheath liquid.

* * * * *